United States Patent [19]

Smith et al.

[11] Patent Number: 5,583,668
[45] Date of Patent: Dec. 10, 1996

[54] HOLOGRAPHIC REPLICATION OF COPY FILM TO HOLOGRAM MASTER

[75] Inventors: Hal D. Smith, Rancho Palos Verdes; Ronald T. Smith, Torrance, both of Calif.

[73] Assignee: Hughes Aircraft Company, Los Angeles, Calif.

[21] Appl. No.: 391,385

[22] Filed: Feb. 21, 1995

Related U.S. Application Data

[63] Continuation of Ser. No. 31,152, Mar. 12, 1993, abandoned.
[51] Int. Cl.$^6$ ................ G03H 1/04; G03H 1/26
[52] U.S. Cl. ................ 359/12; 359/900; 355/2
[58] Field of Search ................ 359/1, 6, 12, 35; 355/2

[56] References Cited

U.S. PATENT DOCUMENTS

| 4,034,381 | 7/1977 | Moraw et al. | 346/151 |
| 4,416,540 | 11/1983 | Nicholson | 359/900 |

*Primary Examiner*—Jon W. Henry
*Attorney, Agent, or Firm*—Leonard A. Alkov; W. K. Denson-Low

[57] ABSTRACT

A technique for fixedly positioning a holographic recording laminate relative to a master hologram including the steps of inducing a electrostatic charge on the holographic recording laminate and positioning the recording laminate in close proximity to the master hologram such that the electrostatic charge on the recording laminate causes a static attraction between the recording laminate and the master hologram that retains the recording laminate in a fixed position relative to the master hologram.

1 Claim, 1 Drawing Sheet

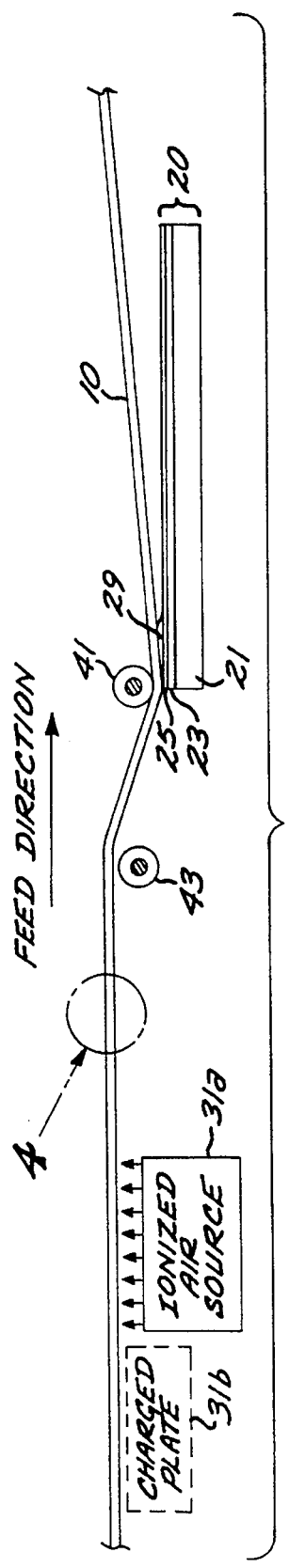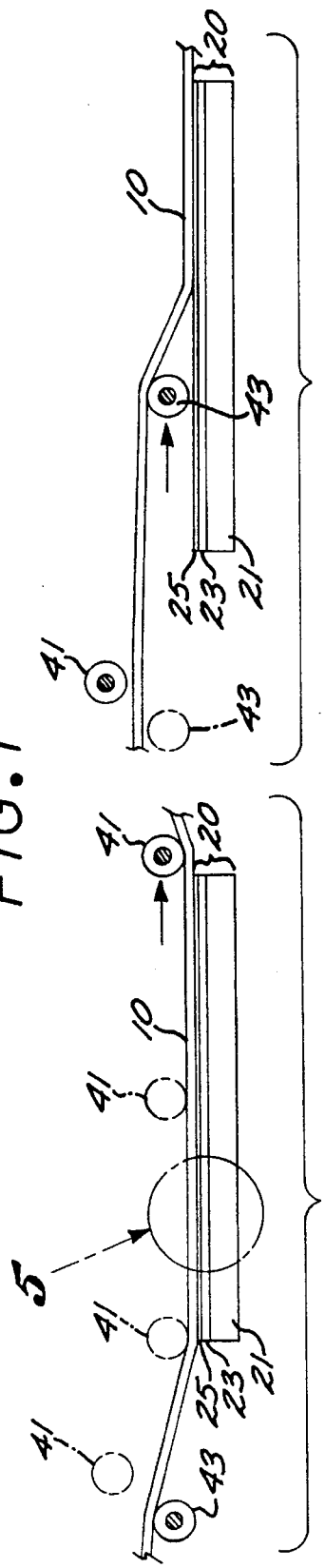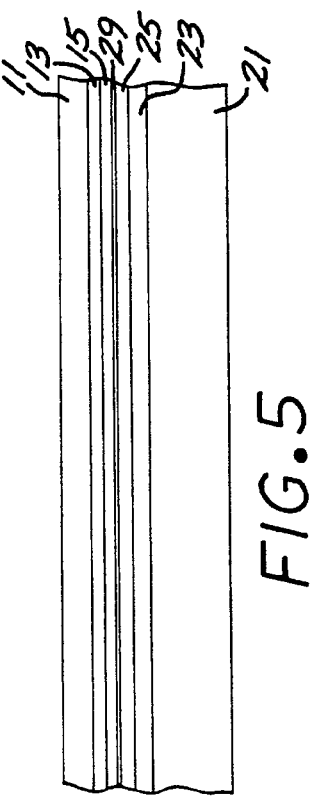

HOLOGRAPHIC REPLICATION OF COPY FILM TO HOLOGRAM MASTER

This is a continuation application Ser. No. 08/031,152 filed Mar. 12, 1993 now abandoned.

BACKGROUND OF THE INVENTION

The subject invention is directed a method of contactively engaging a hologram recording film with a master hologram via static charge attraction.

Copies of holograms are commonly made by positioning hologram recording film adjacent to a master hologram, and then exposing the hologram recording film by illuminating the master hologram with reconstruction illumination. In this process, it is important that the recording film and the master hologram be fixedly positioned parallel to each other so that there is virtually no relative movement between the recording film and the master hologram during the holographic exposure. In practice, this relative motion must be no greater than a fraction of the wavelength of the exposure laser light, typically less than 500 Angstroms. In addition, it is necessary that a close to constant optical refractive index be provided between the recording film and the master hologram.

Known techniques for fixedly positioning a hologram recording film relative to a master hologram include weighting or the use of a vacuum chuck. In laboratory reproduction, a hand roller might be used to fixedly position hologram recording film relative to a master hologram. An important consideration with known techniques in general is the required expenditure of time, which prevents high rate copying. Weighting and the use of a vacuum chuck require different arrangements and/or equipment for transmission holograms and for reflection holograms.

SUMMARY OF THE INVENTION

It would therefore be an advantage to provide a hologram replication arrangement that is amenable to high speed copying.

Another advantage would be to provide a hologram replication arrangement that can be used for replication of transmission holograms and reflection holograms.

The foregoing and other advantages are provided by the invention in a hologram replication exposure arrangement which includes means for inducing an electrostatic charge on a hologram recording film, and means for positioning the electrostatically charged hologram recording laminate into close proximity with a master hologram laminate so that the hologram recording laminate and master hologram are fixedly positioned relative each other as a result of the attraction force produced by the electrostatic charge.

BRIEF DESCRIPTION OF THE DRAWINGS

The advantages and features of the disclosed invention will readily be appreciated by persons skilled in the art from the following detailed description when read in conjunction with the drawing wherein:

FIG. 1 schematically sets forth an exposure system which fixedly positions a holographic replication film to a master hologram plate by electrostatic attraction in accordance with the invention.

FIG. 2 is an illustration of the holographic replication film in close contact with the hologram master plate and ready for exposure.

FIG. 3 is an illustration of the holographic replication film being separated from the master hologram plate by a mechanical roller.

FIG. 4 is a cross-sectional view of the holographic replication film.

FIG. 5 is a close-up, cross-sectional view of the holographic replication film in intimate contact with the master hologram plate.

DETAILED DESCRIPTION OF THE DISCLOSURE

In the following detailed description and in the several figures of the drawing, like elements are identified with like reference numerals.

FIG. 1 schematically illustrates an exposure arrangement in accordance with the invention for exposing a hologram recording layer contained in an elongated recording laminate 10 pursuant to reconstruction of a master hologram layer 23 contained in a master hologram laminate 20 which includes a glass substrate 21 for supporting the master hologram layer 23 and a transparent glass cover layer 25 disposed over the master hologram layer 23. As shown in FIG. 4, elongated recording laminate includes a carrier film 11 for supporting a hologram recording layer 13 and a transparent cover film 15 comprising a polymer film that is capable of being electrostatically charged, such as Mylar.

By way of illustrative example, the master hologram laminate is oriented with the master hologram glass cover layer 25 on top, and the recording laminate 10 is oriented so that the recording layer cover film 15 can be controllably engaged with the master hologram glass cover layer 25, either by direct contact or with a very thin layer index matching fluid between the covers.

Hologram exposures are made on the hologram recording laminate 10 by individually engaging and exposing a series of adjacent non-overlapping areas or frames of the recording laminate 10 with the master hologram laminate for exposure pursuant to a reconstruction beam directed to the master hologram from the glass substrate side. For example, the recording laminate 10 could be moved in an indexed manner in a feed direction as indicated on FIG. 1 such that each of series of non-overlapping recording areas can be individually engaged with the master hologram laminate and exposed.

In accordance with the invention, an electrostatic charge is induced on the recording laminate cover 15 prior to engagement with the master hologram laminate. By way of illustrative examples, the recording laminate is supported above the master hologram laminate 20 and is electrostatically charged by a source of ionized air 31a or by contact with a charged plate 31b as it is fed into position over the master hologram laminate 20. Alternatively, the recording laminate 10 could be supported beneath the master hologram laminate, in which case both laminates would be inverted from the orientations shown in FIG. 1.

When an exposure frame is aligned with the master hologram laminate 20, it is brought into engagement with the master hologram laminate by a pressure roller 41 which lowered to press an edge of exposure frame that is orthogonal to the feed direction against the corresponding edge of the master hologram laminate. Index matching fluid 29 can then be sprayed or squirted along the intersection of the exposure frame and master hologram laminate, and the pressure roller 41 is moved to so as to roll the exposure frame against the master hologram laminate 20, as shown in FIG. 2, and to spread the index matching fluid 29 if utilized. The pressure roller 41 is retracted when it reaches the distal edge of the master hologram laminate 20.

When the exposure frame of the recording laminate 10 and master hologram laminate 20 are engaged as just described, either directly or with an intervening layer of index matching fluid 29, the electrostatic charge on the exposure frame produces an electrostatic attraction between the recording laminate cover film 15 and the master hologram glass cover layer 25, which causes the exposure frame and master cover film to be tightly and fixedly positioned parallel to each other without any air interfaces between the recording layer and the master hologram, such that the optical index between the recording layer and the master hologram layer is close to being constant. If index matching fluid 29 is utilized, the electrostatic attraction further functions to distribute the index matching fluid until the viscous force balances the electrostatic force, at which time the index matching fluid will be uniformly distributed. As a result of the electrostatic attraction, the settling time of the index matching fluid is reduced.

Exposure is made, after any delay required for settling of the index matching fluid, by appropriately illuminating the assembly of FIG. 5 with a beam of laser light. In the case of replicating a reflection hologram, the beam is directed to be incident on the recording laminate side of the intimately engaged recording laminate and master hologram laminate. The beam passes through the hologram recording layer 13 and illuminates the master hologram layer 23 which reflectively diffracts a portion of the incident beam towards the hologram recording layer 13. The incident and reflectively diffracted beams interfere in the hologram recording layer 13 to create a standing wave which is recorded in hologram recording layer 13. In the case of replicating a transmission hologram, the beam is directed to be incident on the master hologram laminate side of the intimately engaged recording laminate and master hologram laminate. As it passes through the master hologram 23, a portion thereof is partially transmissively diffracted while the remaining portion is not diffracted. The diffracted light and the non-diffracted light interfere in the hologram recording layer 13 to form a standing wave that is recorded in hologram recording layer 13.

After exposure, the recording laminate 10 is separated from the master laminate by a separation roller 43 which engages the recording laminate from below to separate the exposure frame from the proximal edge of the master hologram laminate. The roller is then displaced in the feed direction generally parallel to the master hologram laminate so as to peel the exposure frame from the master hologram laminate, as illustrated in FIG. 3. As a modification to the foregoing separation procedure, the recording laminate 10 can be sprayed on its exposed side with a deionizing spray prior to separating engagement thereof by the separation roller 43.

After the recording laminate is separated from master hologram laminate, the recording laminate is advanced in the feed direction by an indexed amount so as to position the next exposure frame above the master hologram, and the above described is repeated as to engaging such exposure frame with the master hologram, exposure thereof, and separation of the exposure frame from the master hologram laminate.

The foregoing has been a disclosure of a hologram replication arrangement that is amenable to high speed copy applications, and utilizes the same arrangement for both transmission and reflection holograms.

Although the foregoing has been a description and illustration of specific embodiments of the invention, various modifications and changes thereto can be made by persons skilled in the art without departing from the scope and spirit of the invention as defined by the following claims.

What is claimed is:

1. A method for fixedly positioning an elongated recording laminate (10) relative to a master hologram laminate (20), wherein the elongated recording laminate (10) includes a carrier film (11) for supporting a hologram recording layer (13) in contact with a transparent cover film (15) that is capable of being statically charged, and wherein the master hologram laminate (20) includes a master hologram layer (23) supported on a glass substrate (21), and a transparent master hologram glass cover layer (25) is disposed over the master hologram layer (23), the method comprising:

orienting the master hologram laminate (20) so that the transparent master hologram glass cover layer (25) is positioned on top of the master hologram laminate (20);

orienting the elongated recording laminate (10) so that the transparent recording layer cover film (15) can be controllably engaged with the transparent master hologram glass cover layer (25) with a very thin layer index matching fluid (29) between the transparent recording layer cover film (15) and the transparent master hologram cover layer (25);

inducing an electrostatic charge on the transparent recording layer cover film (15); and positioning the elongated recording laminate (10) in close proximity to the master hologram laminate (20) such that the electrostatic charge on the transparent recording layer cover film (15) causes a static attraction between the elongated recording laminate (10) and the master hologram laminate (20) that retains the elongated recording laminate (10) in a fixed position relative to the master hologram laminate (20), with the steps of:

(i) applying a pressure roller (41) against the elongated recording laminate (10) to engage a portion of the elongated recording laminate (10) against a portion of the master hologram laminate (20);

(ii) introducing said very thin index layer matching fluid (29) into the region adjacent engaged portions of the elongated recording laminate (10) and the master hologram laminate (20), and (iii) moving the pressure roller (41) so as to press the elongated recording laminate (10) into close proximity with the master hologram laminate (20) and to distribute the very thin layer index matching fluid (29).

* * * * *